United States Patent
Sidles et al.

(10) Patent No.: US 11,434,814 B2
(45) Date of Patent: Sep. 6, 2022

(54) TURBOCHARGER SHAFT WOBBLE SENSOR

(71) Applicant: Caterpillar Inc., Deerfield, IL (US)

(72) Inventors: Timothy Gibbs Sidles, Oswego, IL (US); Kyle B. Walton, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 699 days.

(21) Appl. No.: 16/238,300

(22) Filed: Jan. 2, 2019

(65) Prior Publication Data
US 2020/0208571 A1 Jul. 2, 2020

(51) Int. Cl.
| | | |
|---|---|---|
| F02B 39/00 | (2006.01) |
| G01M 15/04 | (2006.01) |
| G01M 13/00 | (2019.01) |
| F02B 37/00 | (2006.01) |
| F02C 6/12 | (2006.01) |

(52) U.S. Cl.
CPC .............. *F02B 39/00* (2013.01); *F02B 37/00* (2013.01); *F02C 6/12* (2013.01); *G01M 13/00* (2013.01); *G01M 15/04* (2013.01)

(58) Field of Classification Search
CPC ...... G01M 15/04; G01M 13/00; G01M 15/14; F02B 39/00; F02B 39/16; F05D 2260/80
See application file for complete search history.

(56) References Cited

U.S. PATENT DOCUMENTS

| | | | |
|---|---|---|---|
| 6,594,619 B1 | 7/2003 | Von Flotow | |
| 6,661,222 B1 | 12/2003 | Twerdochlib | |
| 7,259,552 B2 | 8/2007 | Twerdochlib | |
| 8,146,358 B2 | 4/2012 | Greentree | |
| 9,574,965 B2 | 2/2017 | Furman et al. | |
| 2003/0020496 A1* | 1/2003 | Eyraud | G01B 7/144 324/699 |
| 2013/0067911 A1* | 3/2013 | Worden | G01M 1/24 60/598 |
| 2013/0073172 A1* | 3/2013 | Worden | F04D 27/001 701/101 |

* cited by examiner

*Primary Examiner* — Eric S. McCall
*Assistant Examiner* — Timothy P Graves
(74) *Attorney, Agent, or Firm* — von Briesen & Roper, s.c.

(57) ABSTRACT

A turbocharger for a machine is disclosed. The turbocharger may comprise a turbine section including a turbine housing and a turbine wheel, a compressor section including a compressor housing and a compressor wheel with a plurality of blades, and a shaft rotatably coupling the turbine wheel and the compressor wheel. The turbocharger may further comprise a health sensor mounted to the compressor housing and including a plurality of wire loops. The plurality of wire loops may be consecutively broken upon impact with the blades of the compressor wheel or a structure assembled on the compressor wheel as the turbocharger wears over time. The health monitor may be configured to detect a number of wire loops broken by impact with the blades of the compressor wheel or the structure, and the number of wire loops broken may indicate a wear condition of the turbocharger.

20 Claims, 9 Drawing Sheets

TURBOCHARGER SHAFT WOBBLE SENSOR

TECHNICAL FIELD

The present disclosure generally relates to turbochargers and, more specifically, to health sensors configured to detect the remaining service life of turbochargers.

BACKGROUND

Many machines and vehicles include a turbocharger that uses the exhaust gas flow to increase the boost pressure of the intake air that is supplied to the engine. A turbocharger may have a compressor section with a compressor wheel, a turbine section with a turbine wheel, and a shaft rotatably coupling the compressor wheel and the turbine wheel. The flow of exhaust gas from the engine through the turbine section may cause the turbine wheel to rotate and drive the rotation of the compressor wheel via the interconnecting shaft. The rotating compressor wheel may pressurize the intake air that is supplied to the engine through the intake manifold.

The shaft of the turbocharger may be mounted on one or more bearings. Over time and with extended use of the turbocharger, the bearings and the shaft may wear down. As the wear clearances become larger, the compressor wheel and the turbine wheel may wobble and impinge on or impact the walls of their respective housings as wheels rotate. On the compressor side of the turbocharger, resulting damage to the compressor housing may lead to pieces of the housing walls or wheel blades being discharged through the intake piping, causing engine damage and reduced engine performance. Damage to the blades and walls of the turbocharger housings caused by wobbling of the compressor and turbine wheels may be a good indicator that the turbocharger has reached or is nearing the end of its service life, and may be ready for replacement. In order to avoid extended unscheduled machine downtime and increased costs when turbocharger failure causes additional engine damage, systems capable of detecting the wear condition of a turbocharger are desirable. For instance, systems that produce a signal or warning indicating that the turbocharger is near the end of its service life due to wear are particularly desirable so that turbocharger replacement can be scheduled before the turbocharger fails and the machine has to be taken out of service at a tremendous cost.

U.S. Pat. No. 8,146,358 discloses a turbocharger bearing health monitor that is mounted to the compressor housing to detect the passage of the compressor blades. The information is collected by the engine control unit (ECU) to establish an indicator of the condition of the turbocharger bearings.

However, improved sensors capable of detecting and signaling the wear condition of a turbocharger are still wanting. Specifically, there is a need for sensing systems that detect when a turbocharger is near or at the end of its service life, and produce a signal to notify appropriate personnel to schedule turbocharger replacement.

SUMMARY

In accordance with one aspect of the present disclosure, a turbocharger for a machine is disclosed. The turbocharger may comprise a turbine section including a turbine housing and a turbine wheel, a compressor section including a compressor housing and a compressor wheel with a plurality of blades, a shaft rotatably coupling the turbine wheel and the compressor wheel, and one or more bearings associated with the shaft. The turbocharger may further comprise a health sensor mounted to the compressor section and including a plurality of wire loops. The plurality of wire loops may be consecutively broken upon impact with the blades of the compressor wheel or a structure assembled on the compressor wheel as the turbocharger wears over time. The health sensor may be configured to detect a number of wire loops broken by impact with the blades of the compressor wheel or the structure, and the number of wire loops broken may indicate a wear condition of the turbocharger.

In accordance with another aspect of the present disclosure, a machine is disclosed. The machine may comprise an electronic control module (ECM), an operator display, and a turbocharger. The turbocharger may include a turbine section having a turbine wheel with a plurality of blades, a compressor section having a compressor housing and a compressor wheel with a plurality of blades, a shaft rotatably coupling the turbine wheel and the compressor wheel, and one or more bearings associated with the shaft. The machine may further comprise a health sensor mounted to the compressor section and including a plurality of wire loops. The plurality of wire loops may be consecutively broken upon impact with the blades of the compressor wheel or a structure assembled on the compressor wheel as the turbocharger wears over time. The health sensor may be configured to detect a number of wire loops broken and to transmit signals indicative of the number of wire loops broken to the ECM. The ECM may be configured to produce a signal indicative of a wear condition of the turbocharger based on the number of wire loops broken.

In accordance with another aspect of the present disclosure, a method of determining a wear condition of a turbocharger of a machine using a health sensor is disclosed. The turbocharger may include a compressor housing and a compressor wheel with a plurality of blades. The health sensor may be mounted to the compressor section and may include a plurality of wire loops. The method may comprise determining a number of the wire loops broken by impact with the blades of the compressor wheel or a structure assembled on the compressor wheel as the turbocharger wears over time, determining a wear condition of the turbocharger based on the number of wire loops broken, and outputting a signal indicating the wear condition of the turbocharger to an operator display of the machine.

These and other aspects and features of the present disclosure will be more readily understood when read in conjunction with the accompanying drawings.

DETAILED DESCRIPTION

Figure 1:
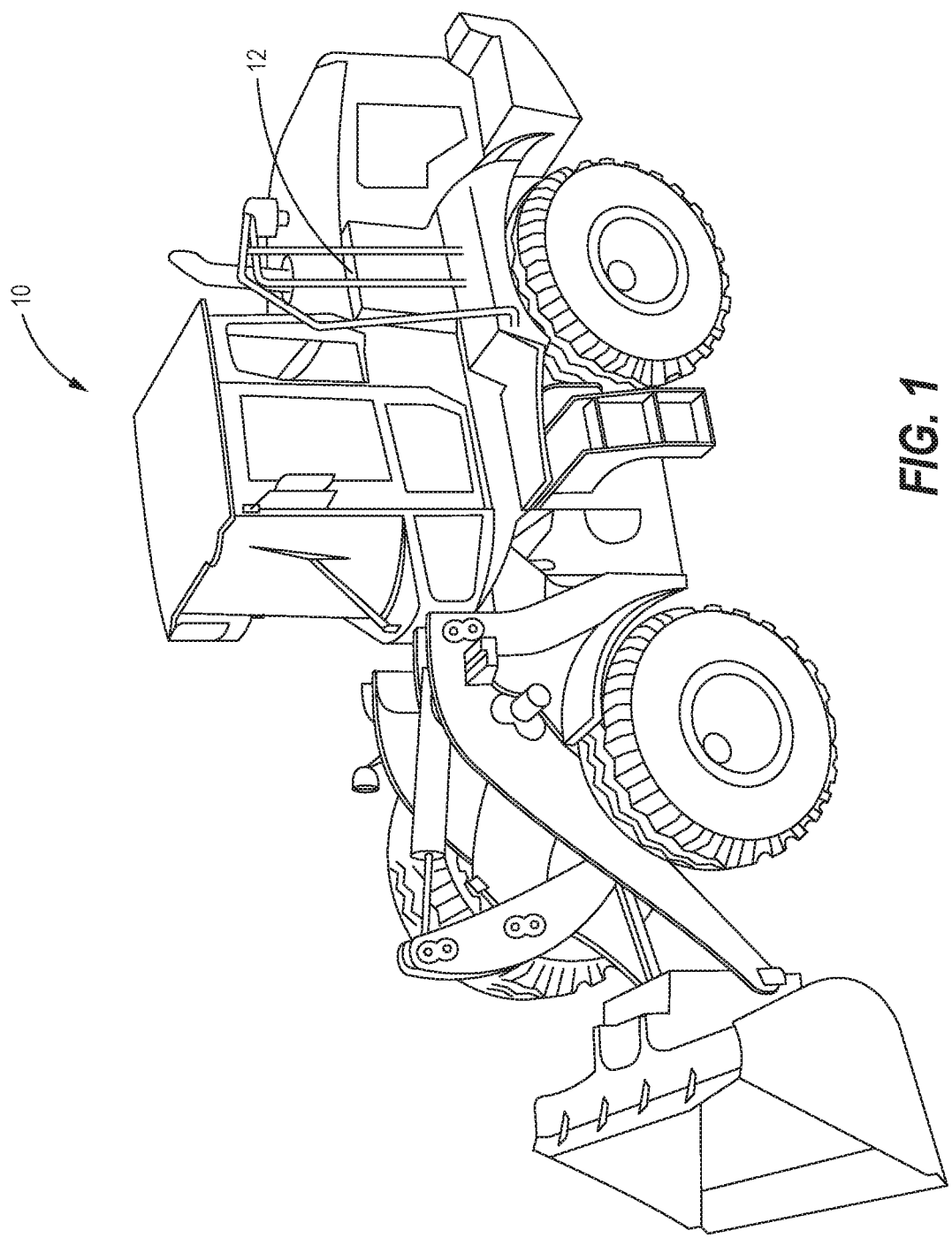
FIG. 1 is a side view of a machine, constructed in accordance with the present disclosure.

Referring now to the drawings, and with specific reference to FIG. 1, a machine 10 is shown. The machine 10 may be any type of mobile or stationary equipment that includes a turbocharger as discussed in further detail below. As non-limiting examples, the machine 10 may be a wheel loader, a motor grader, an excavator, an articulated truck, an off-highway truck, or vehicle. The machine 10 may include an engine 12, and a turbocharger 14 (also see FIG. 2) that increases the efficiency and power output of the engine 12 by forcing extra compressed air into the engine's combustion chamber for combustion.

Figure 2:
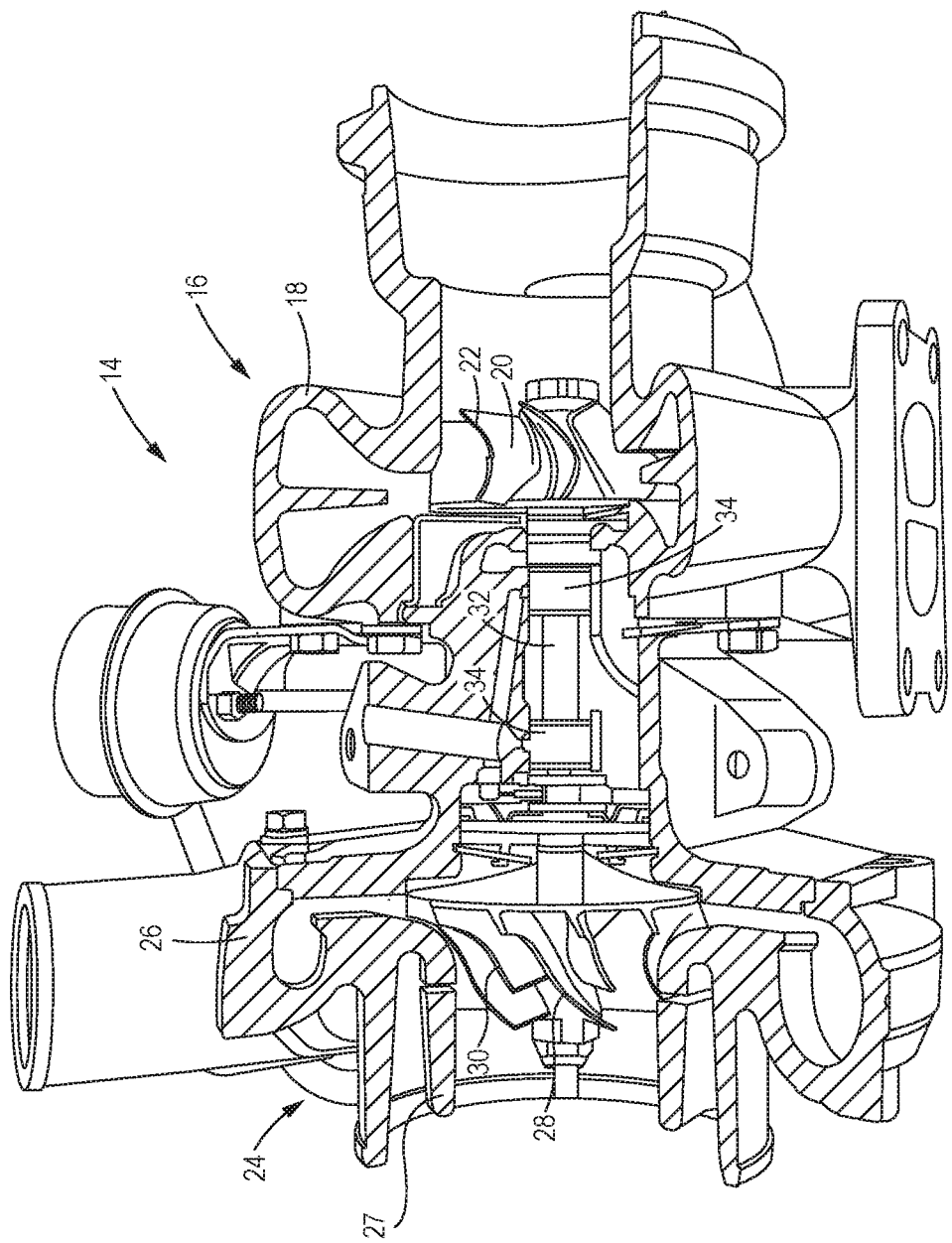
FIG. 2 is partial cross-sectional view of a turbocharger of the machine with a health sensor removed for clarity, constructed in accordance with the present disclosure.

Turning to FIG. 2, the turbocharger 14 of the machine 10 is shown in detail. The turbocharger 14 may include a turbine section 16 having a turbine housing 18 and a turbine wheel 20 with a plurality of blades 22, and a compressor section 24 having a compressor housing 26, a compressor inlet 27, and a compressor wheel 28 with a plurality of blades 30. A shaft 32, supported by one or more bearings 34, may rotatably couple the turbine wheel 20 and the compressor wheel 28. The flow of exhaust gas from the engine 12 through the turbine section 16 may cause the turbine wheel 20 to rotate, thereby driving the rotation of the compressor wheel 28 via the interconnecting shaft 32. The rotating compressor wheel 28 may pressurize the intake air that is supplied to the engine 12, allowing more fuel to be combusted and providing an increase in power.

With extended use of the turbocharger 14, the bearings 34 may wear and the clearance between the bearings 34 and the shaft 32 may increase. The increased clearance may allow the compressor wheel 28 and the turbine wheel 20 to wobble and impact their respective housings 26 and 18, causing damage to the walls of the housings 26 and 18. The wobbling of the compressor wheel 28 and the turbine wheel 20 may be an indicator that the turbocharger 14 is nearing or has reached a wear condition associated with the end of its service life.

Figure 3:
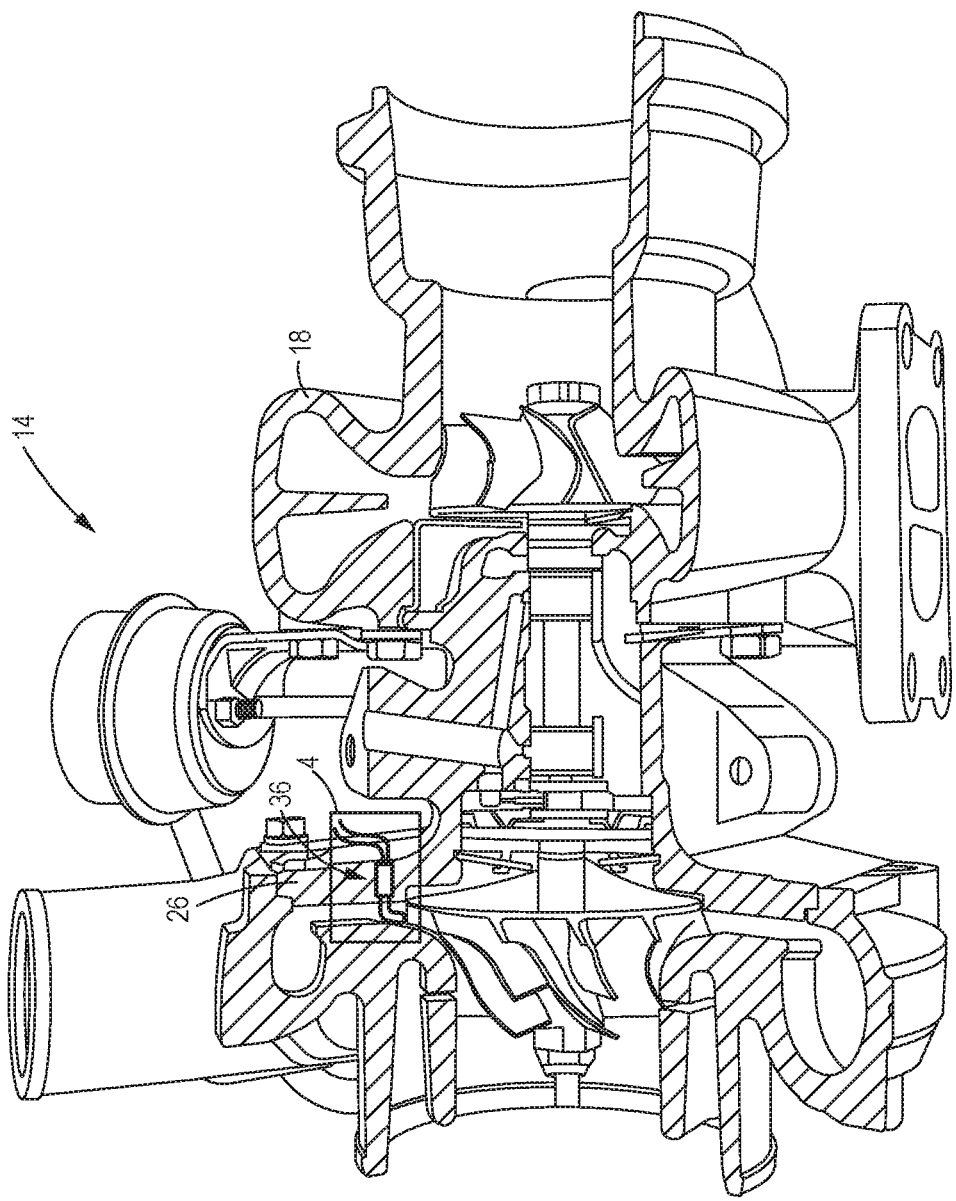
FIG. 3 is a partial cross-section view of the turbocharger of FIG. 2 with the health sensor, constructed in accordance with the present disclosure.
Figure 4:
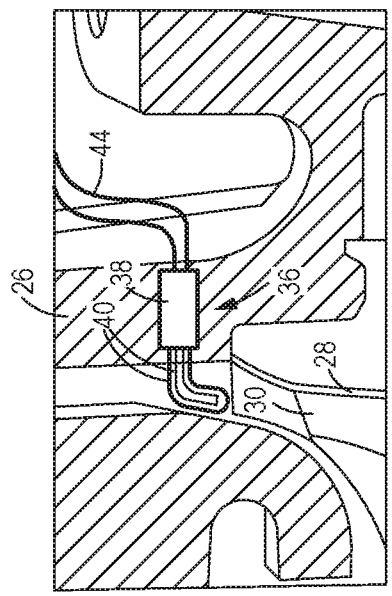
FIG. 4 is an expanded view of detail 4 of FIG. 3, constructed in accordance with the present disclosure.

To detect the wobbling of the compressor wheel 28, the turbocharger 14 of the present disclosure may include a health sensor 36 mounted to the compressor housing 26 (see FIGS. 3-4). The position of the health sensor 36 on the compressor housing 26 shown in FIGS. 3-4 is merely exemplary, as the health sensor 36 may be mounted at other locations of the compressor housing 26 depending on a number of design considerations. The health sensor 36 may include a printed circuit board (PCB) 38 with a plurality of wire loops 40 attached thereto. The wire loops 40 may be integrated in the PCB 38 and/or may dangle from the PCB 38 over the blades 30 of the compressor wheel 28. For example, the wire loops 40 may be wire traces or a conductive feature on the PCB 38. In one example, the wire loops 40 may be positioned radially outward of the blades 30 in the compressor housing 26 and near enough to the blades 30 so that wobbling of the compressor wheel 28 causes the blades 30 to impact the wire loops 40. In other arrangements, the wire loops 40 may be positioned axially inward or axially outward of the compressor wheel 28. To facilitate breakage of the wire loops 40 by impact with the blades 30, the wire loops 40 may coated with an abradable coating. In an alternative arrangement, the health sensor 36 may be mounted to the turbine housing 18 to detect wear of the turbocharger 14.

As the wear of the bearings 34 progresses and the degree of compressor wheel wobbling increases, the blades 30 may impact and break more of the wire loops 40 consecutively. The breakage of each of the wire loops 40 may be detected by the health sensor 36, and the health sensor 36 may transmit signals indicating breakage of the wire loops 40 to an electronic control module (ECM) 42 via electrical transmission through wires 44 or wireless transmission (also see FIG. 7). In particular, the signals transmitted to the ECM 42 from the health sensor 36 may indicate the number of wires loops 40 broken (or the wear condition of the turbocharger 14), and the ECM 42 may output a signal indicating a wear condition of the turbocharger 14 based on the number of wire loops 40 broken. Either the ECM 42 or the health sensor 36 may be configured to determine the wear condition of the turbocharger 14 based on the number of wire loops 40 that are broken. In response to receipt of the signals from the health sensor 36, the ECM 42 may output signals indicative of the wear condition for viewing at internal and external sites (see further details below). As the number of wire loops 40 broken increases, the urgency of the signal generated by the ECM 42 indicating that the turbocharger 14 should be replaced increases (see further details below).

Figure 6:
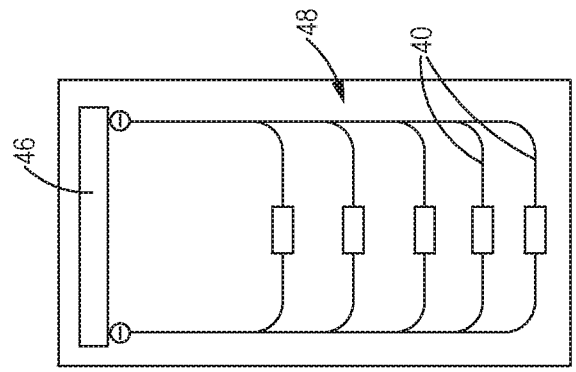
FIG. 6 is a plan view of the health sensor similar to FIG. 5 but with wire loops arranged in a resistive ladder, constructed in accordance with the present disclosure.
Figure 5:
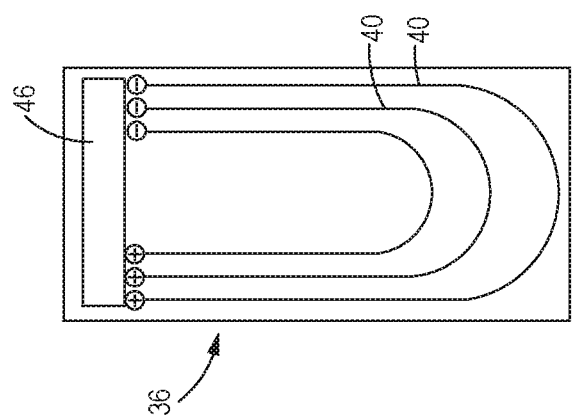
FIG. 5 is a plan view of the health sensor shown in isolation, constructed in accordance with the present disclosure.

As shown in FIG. 5, the health sensor 36 may include a microprocessor 46 connected to the wire loops 40 that monitors the voltage in each wire loop 40 and detects the breakage of the wire loops 40 by a voltage decrease. More specifically, the breakage of a wire loop 40 leads to an open circuit and the elimination of the voltage (voltage drop) in the broken wire loop 40. Alternatively, as shown in FIG. 6, the plurality of wire loops 40 may be arranged and connected in a resistive ladder 48, allowing the microprocessor 46 to detect breakage of each of the wire loops 40 by a decrease in resistance (see FIG. 6). In either arrangement, the microprocessor 46 may transmit signals to the ECM 42 indicative of the number of wire loops 40 broken or the wear condition of the turbocharger 14. The transmitted signals from the microprocessor 46 to the ECM 42 may be controller area network (CAN) signals, or other types of signals including wireless signals. Although FIGS. 5 and 6 show the health sensor 36 having three and five wire loops 40, respectively, it will be understood that the number of wire loops 40 shown is only exemplary and may vary in practice depending on various design considerations.

Figure 8:
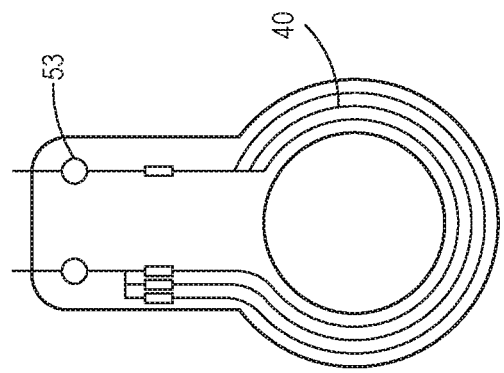
FIG. 8 is a plan view of the health sensor of FIG. 7 shown in isolation, constructed in accordance with the present disclosure.
Figure 9:
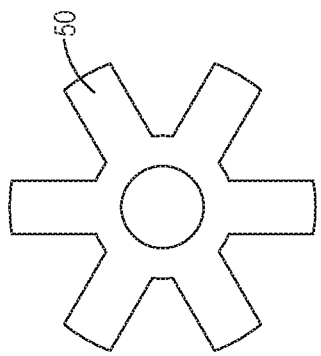
FIG. 9 is a plan view of the nut of FIG. 7 shown in isolation, constructed in accordance with the present disclosure.
Figure 7:
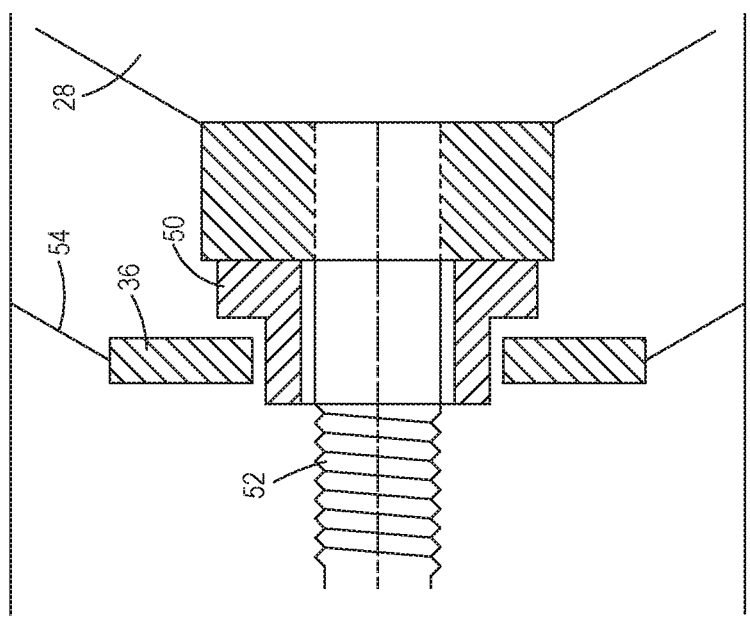
FIG. 7 is a cross-sectional view of a portion of the turbocharger with the health sensor mounted near a nut on a nose of the compressor wheel, constructed in accordance with the present disclosure.

In an alternative arrangement shown in FIGS. 7-9, a nut 50 may be assembled on a nose 52 of the compressor wheel 28 (and rotatably coupled to the compressor wheel 28) in proximity to the health sensor 36. As above, the health sensor 36 may include the PCB 38, the wire loops 40, and the microprocessor 46. As explained above, the wire loops 40 may be wires, wire traces, or conductive features on the PCM 38. The PCB 38 may have connection points 53 for connection to the ECM 42. As the compressor wheel 28 wobbles with wear over time, the wire loops 40 may be abraded by impact with the nut 50 or a special feature on the nut 50, leading to an open circuit detected by the microprocessor 46 and a change in voltage signal sent to the ECM 42. As in the arrangement of FIGS. 3-6 described above, the number of wire loops 42 broken may be correlated with the remaining service life or wear condition of the turbocharger. As shown in FIG. 7, the health sensor 36 may be mounted to wall of the compressor inlet 27 through one or more supporting structures 54, such as struts or panels.

Figure 10:
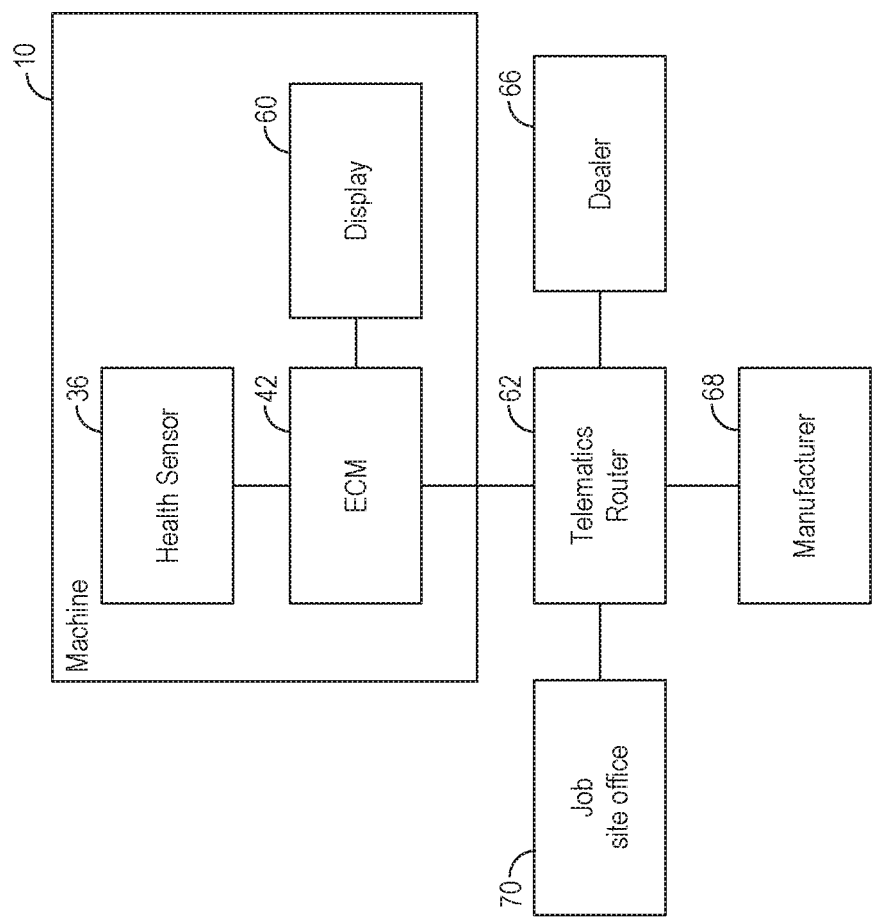
FIG. 10 is a schematic representation illustrating how signals from the health sensor may be transmitted through the machine and to external electronic devices, constructed in accordance with the present disclosure.

FIG. 10 illustrates how the signals from the health sensor 36 may be transmitted through the machine 10 and to various external electronic devices. As discussed above, the health sensor 36 may transmit signals indicative of the number of wires loops broken (or the wear condition of the turbocharger 14) to the ECM 42. The ECM 42 may then output signals indicative of the wear condition of the turbocharger to an operator display 60 of the machine 10 to allow the operator to monitor the health status of the turbocharger 14. The operator display 60 may be a computer screen located in the machine 10, such as in the operator cabin, or it may be a hand-held or remote computerized device with a display. In addition, the signals from the ECM 42 may be output to various external electronic devices separate from the machine 10 via a telematics router 62. The telematics router 62 may include a cellular, Bluetooth®, and/or Wi-Fi modem such that the telematics router 62 may transmit cell phone, Bluetooth®, and/or Wi-Fi signals to the external electronic devices. The external electronic devices may include an electronic device 66 of a dealer (e.g., a service truck or back office) of the machine 10, an electronic device 68 of a manufacturer of the machine 10, and an electronic device 70 at a worksite office near the worksite of the machine 10. The electronic devices 66, 68, and 70 may be any type of electronic device (e.g., computer, cell phone, etc.) that includes a display for viewing the wear condition status transmitted from the ECM 42. If a wear condition signal is received at the electronic devices 66, 68, and 70 indicating that the turbocharger 14 is near the end of its service life, then replacement of the turbocharger 14 may be scheduled, avoiding costly machine downtime. Notifying the worksite office, the dealer of the machine, and the manufacturer of the machine 10 that the turbocharger 14 is near the end of its service life allows coordinated replacement of the worn turbocharger 14 prior to failure of the turbocharger 14.

Figure 11:
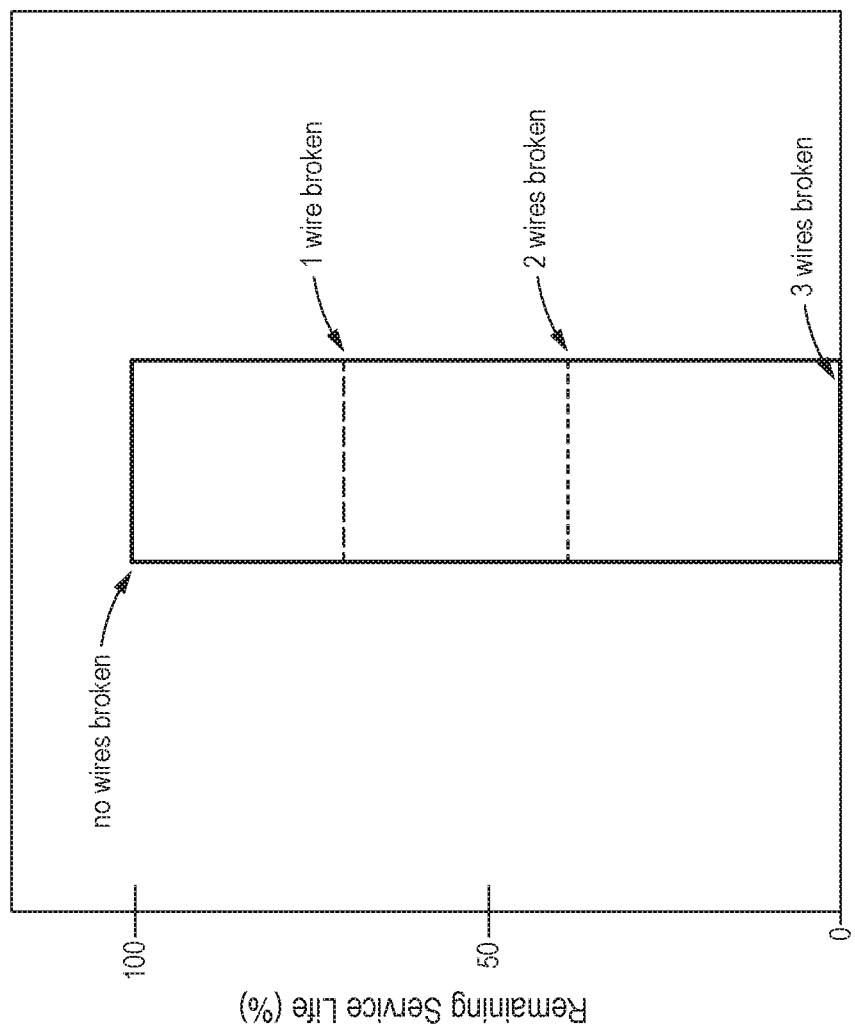
FIG. 11 is an exemplary display indicating a percent remaining service life of the turbocharger generated using the health sensor, constructed in accordance with the present disclosure.

FIG. 11 shows an exemplary output signal indicating the wear condition of the turbocharger 14 that may be viewable at the operator display 60 and at the electronic devices 66, 68, and 70. In this example, the output signal of the wear condition is a bar graph indicating the percent remaining service life of the turbocharger 14. For example, when no wire loops 40 are broken, the bar chart may indicate that the turbocharger has 100% remaining service life. As each wire loop 40 is consecutively broken, the percent remaining service life may decrease, as shown, as the number of wire loops broken may be directly related to the remaining service life of the turbocharger 14. The determination of the percent remaining service life (wear condition) of the turbocharger 14 from the number of wire loops 40 broken may be performed by the health sensor 36 or by the ECM 42, as explained above. In other arrangements, the wear condition of the turbocharger 14 may be displayed as a graph of percent remaining service life that decreases over time, or simply as a number value indicating the percent remaining service life (e.g., 100%, 40%, etc.).

Figure 12:
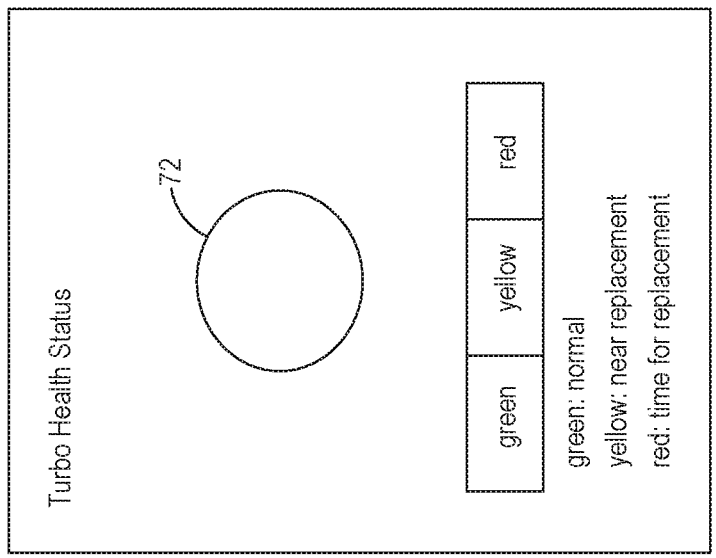
FIG. 12 is another exemplary display having a color signal indicating whether the turbocharger is ready for replacement, constructed in accordance with the present disclosure.

Alternatively, the wear condition of the turbocharger 14 may be displayed at the operator display 60 and at the electronic devices 66, 68, and 70 as a color signal 72 that indicates whether or not the turbocharger 14 should be replaced (see FIG. 12). For example, the color signal 72 may be green when the wear condition/health status of the turbocharger 14 is good or normal such that the turbocharger 14 does not need to be replaced, yellow when the turbocharger 14 is nearing the end of its service life and requires replacement soon, and red when the turbocharger 14 is at the end of its service life and requires immediate replacement. As a non-limiting example, a green signal may be generated when no wire loops 40 are broken, a yellow signal may be generated when one or two wire loops 40 are broken, and a red signal may be generated when all of the wire loops 40 are broken. Either the health sensor 36 or the ECM 42 may determine the color signal 72 that is displayed based on the number of wire loops 40 that are broken. It will be understood, however, that the colors and the number of colors for the color signal 72 may vary in practice and are not limited to green, yellow, and red. In other arrangements, other types of output signals such as audible signals or other types of visual signals may be generated to indicate the wear condition/health status of the turbocharger.

INDUSTRIAL APPLICABILITY

In general, the teachings of the present disclosure may find applicability in many industries including, but not limited to, construction, mining, agriculture, and automotive industries. More specifically, the teachings of the present disclosure may be applicable to any industry relying on machines or vehicles with a turbocharger.

Figure 13:
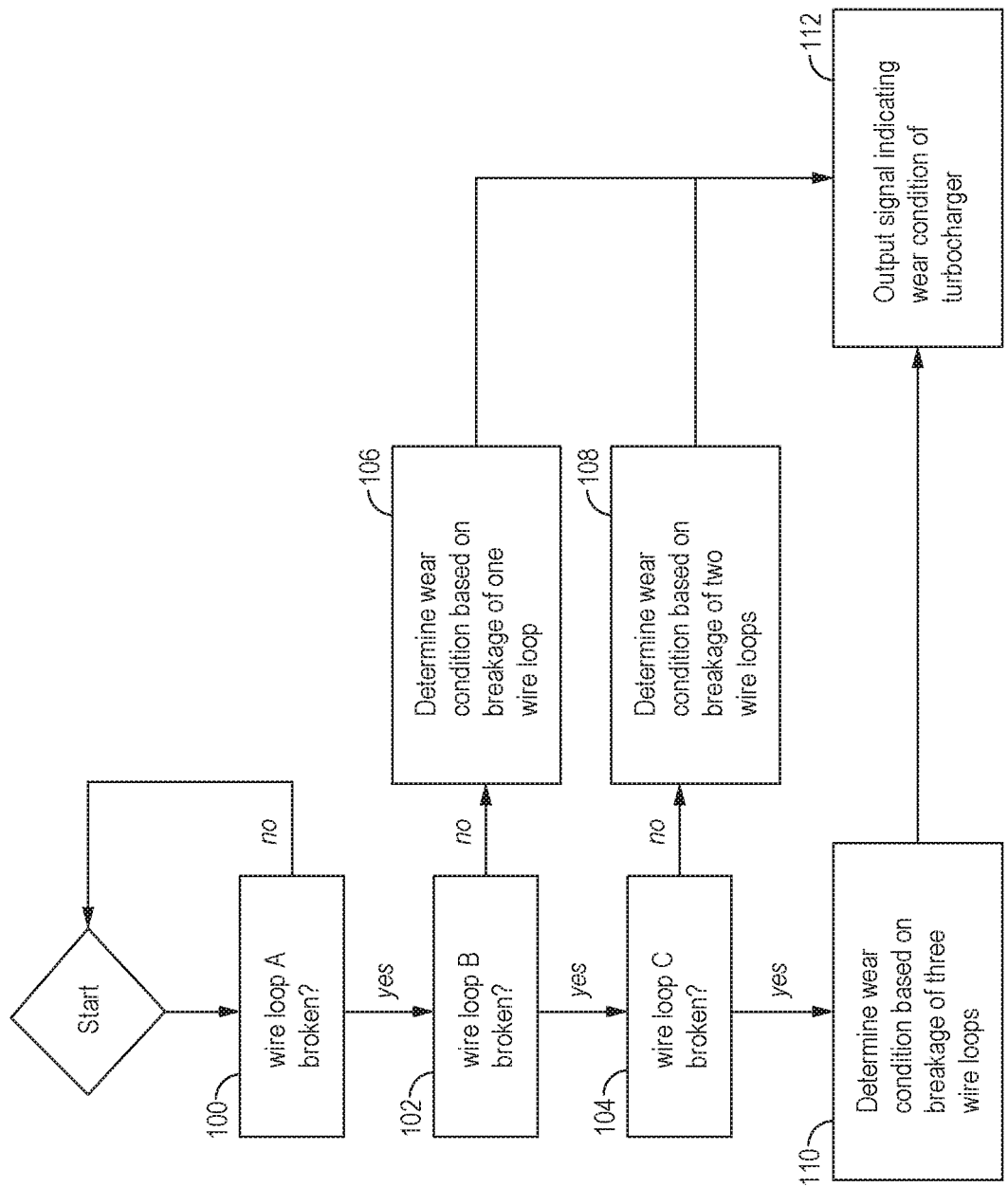
FIG. 13 is a flow chart of a series of steps that may be performed to determine a wear condition of the turbocharger using the health sensor, constructed in accordance with the present disclosure.

FIG. 13 shows a series of steps that may be performed to determine the wear condition of the turbocharger 14 as performed by the health sensor 36 and the ECM 42. According to exemplary blocks 100, 102, and 104, the health sensor 36 may determine the number of wire loops 40 that are broken using voltage or resistance measurements as discussed above. If only a first wire loop 40 is broken (wire loop A), then the health sensor 36 or the ECM 42 may determine the wear condition (remaining service life) of the turbocharger 14 based on the breakage of one wire loop 40 (block 106). If it is determined that the first wire loop 40 (wire loop A) and a second wire loop 40 (wire loop B) are broken, then the health sensor 36 or the ECM 42 may determine the wear condition of the turbocharger 14 based on the breakage of two wire loops 40 (block 108). If it is determined that the first wire loop 40 (wire loop A), the second wire loop 40 (wire loop B), and a third wire loop 40 (wire loop C) are broken, then the health sensor 36 or the ECM 42 may determine the wear condition of the turbocharger 14 based on the breakage of three wire loops 40 (block 110). It will be understood that the method of FIG. 10 is merely exemplary as the health sensor 36 may have less than or more than three wire loops 40, and the wear condition of the turbocharger 14 may be assessed based on breakage more or fewer numbers of wire loops 40. After determining the wear condition, the ECM 42 may output a signal indicating the wear condition of the turbocharger 14 to the operator display 60, as well as to external electronic devices (the dealer's electronic device 66, the manufacturer's electronic device 68, and the worksite office electronic device 70) via the telematics router 62. As explained above, the wear condition may be output as the percent remaining service life of the turbocharger, as a color signal, or other readily interpreted signals.

The turbocharger health sensor disclosed herein allows the wear condition/health status of a turbocharger to be assessed locally at a machine operator display, as well remotely at a worksite office, dealer office, or manufacturer office. The health sensor may include wire loops that are broken sequentially by impact with a structure on the compressor wheel (e.g., the blades of the compressor wheel, or a nut assembled on the compressor wheel nose) as the wear of the turbocharger progresses. The number of wire loops broken tracks with the wear of the turbocharger, such that the wear condition of the turbocharger at a given time can be assessed based on the number of wire loops broken. The wear condition may be output (via the ECM) as a signal indicating a percent remaining service life, as a color signal indicating whether or not the turbocharger should be replaced, or other type of signal. The health sensor of the present disclosure thus helps to avoid costly unscheduled machine downtime during a work operation when the turbocharger unexpectedly fails, as the replacement of the turbocharger may be coordinated and scheduled in advance of failure. In addition, the health sensor of the present disclosure may be retrofitted on turbochargers already in use to monitor the health status of the turbocharger.

What is claimed is:

1. A turbocharger for a machine, comprising: a turbine section including a turbine housing and a turbine wheel; a compressor section including a compressor housing and a compressor wheel with a plurality of blades; a shaft rotatably coupling the turbine wheel and the compressor wheel; one or more bearings associated with the shaft; and a health sensor mounted to the compressor section and including a plurality of wire loops, the plurality of wire loops being consecutively broken upon impact with a rotating structure of the turbocharger as the turbocharger wears over time, the health sensor being configured to detect a number of wire loops broken by impact with the structure, the number of wire loops broken indicating a wear condition of the turbocharger, wherein the rotating structure is a nut assembled on a nose of the compressor wheel and the wire loops are consecutively broken by impact with the nut.

2. The turbocharger of claim 1, wherein each of the wire loops include an abradable coating that abrades away upon impact with the compressor wheel or the structure.

3. The turbocharger of claim 1, wherein the health sensor includes a printed circuit board (PCB) with the plurality of wire loops attached thereto.

4. The turbocharger of claim 3, wherein the health sensor is configured to transmit signals indicative of the number of wire loops broken to an electronic control module (ECM) of the machine.

5. The turbocharger of claim 4, wherein the PCB is mounted to a compressor inlet of the compressor section in proximity to the nut.

6. The turbocharger of claim 4, wherein the wire loops are consecutively broken by impact with the blades of the compressor wheel, and wherein the health sensor is mounted to the compressor housing.

7. The turbocharger of claim 4, wherein the health sensor further includes a microprocessor that detects breakage of each of the wire loops by a voltage decrease.

8. The turbocharger of claim 4, wherein the plurality of wire loops are arranged and connected in a resistive ladder, and wherein breakage of each of the wire loops is detected by the health sensor as a change in resistance.

9. A machine, comprising:
   an electronic control module (ECM);
   an operator display;
   a turbocharger including a turbine section having a turbine wheel with a plurality of blades, a compressor section having compressor housing and a compressor wheel with a plurality of blades, a shaft rotatably coupling the turbine wheel and the compressor wheel, and one or more bearings associated with the shaft; and
   a health sensor mounted to the compressor section and including a plurality of wire loops and a printed circuit board (PCB) with the plurality of wire loops attached thereto, the plurality of wire loops being consecutively broken upon impact with a structure assembled on the compressor wheel as the turbocharger wears over time, the health sensor being configured to detect a number of wire loops broken and to transmit signals indicative of the number of wire loops broken to the ECM, the ECM being configured to produce a signal indicative of a wear condition of the turbocharger based on the number of wire loops broken, wherein the structure is a nut assembled on a nose of the compressor wheel and the wire loops are consecutively broken by impact with the nut, and wherein the PCB is mounted to a compressor inlet of the compressor section in proximity to the nut.

10. The machine of claim 9, wherein the ECM is further configured to transmit the signal indicative of the wear condition of the turbocharger to the operator display for viewing by an operator of the machine.

11. The machine of claim 10, wherein the signal indicative of the wear condition of the turbocharger is a signal indicating a percent remaining service life of the turbocharger.

12. The machine of claim 10, wherein the signal indicative of the wear condition of the turbocharger is a color signal indicating whether the turbocharger is ready for replacement.

13. The machine of claim 10, wherein the ECM is further configured to transmit the signal indicative of the wear condition of the turbocharger for display at external electronic devices via a telematics router.

14. The machine of claim 13, wherein the external electronic devices include an electronic device of a dealer of the machine, an electronic device of a manufacturer of the machine, and an electronic device located at a worksite office of the machine.

15. The machine of claim 9, wherein the health sensor includes a printed circuit board (PCB) with the plurality of wire loops attached thereto.

16. The machine of claim 15, wherein the health sensor further includes a microprocessor that detects breakage of each of the wire loops by a voltage decrease.

17. The machine of claim 15, wherein the plurality of wire loops are arranged and connected in a resistive ladder, and wherein breakage of each of the wire loops is detected by the health sensor as a change in resistance.

18. A method of determining a wear condition of a turbocharger of a machine using a health sensor, the turbocharger including a compressor housing and a compressor wheel with a plurality of blades, the health sensor being mounted to a compressor section and including a plurality of wire loops, the method comprising: determining a number of the wire loops broken by impact with a rotating structure of the turbocharger as the turbocharger wears over time, wherein the rotating structure is a nut assembled on a nose of the compressor wheel and the wire loops are consecutively broken by impact with the nut; determining a wear condition of the turbocharger based on the number of wire loops broken; and outputting a signal indicating the wear condition of the turbocharger to an operator display of the machine.

19. The method of claim 18, further comprising outputting the signal indicating the wear condition of the turbocharger for display at external electronic devices via a telematics router, the external electronic devices including an electronic device of a dealer of the machine, an electronic device of a manufacturer of the machine, and an electronic device located at a worksite office of the machine.

20. The method of claim 18, wherein the signal indicative of the wear condition of the turbocharger is a signal indicating a percent remaining service life of the turbocharger.

* * * * *